US006792475B1

(12) United States Patent
Arcuri et al.

(10) Patent No.: US 6,792,475 B1
(45) Date of Patent: Sep. 14, 2004

(54) SYSTEM AND METHOD FOR FACILITATING THE DESIGN OF A WEBSITE

(75) Inventors: Michael P. Arcuri, Seattle, WA (US); Robert Mauceri, Seattle, WA (US); Craig Hajduk, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 09/602,805

(22) Filed: Jun. 23, 2000

(51) Int. Cl.[7] ............................................. G06F 15/16
(52) U.S. Cl. ..................................... 709/245; 715/514
(58) Field of Search ................................ 709/217, 218, 709/219, 245; 715/513, 514

(56) References Cited

U.S. PATENT DOCUMENTS

| | | | | |
|---|---|---|---|---|
| 5,819,103 A | * | 10/1998 | Endoh et al. ................... 710/1 |
| 5,886,699 A | * | 3/1999 | Belfiore et al. .............. 345/843 |
| 5,911,145 A | * | 6/1999 | Arora et al. ................. 715/514 |
| 6,009,441 A | * | 12/1999 | Mathieu et al. ............. 715/516 |
| 6,189,019 B1 | * | 2/2001 | Blumer et al. .............. 715/513 |
| 6,249,792 B1 | * | 6/2001 | Zwilling et al. ............. 707/205 |
| 6,268,851 B1 | * | 7/2001 | Bricklin et al. ............. 345/744 |
| 6,292,188 B1 | * | 9/2001 | Carlson et al. ............. 345/854 |
| 6,308,188 B1 | * | 10/2001 | Bernardo et al. ........... 715/530 |
| 6,321,242 B1 | * | 11/2001 | Fogg et al. .................. 715/513 |
| 6,449,615 B1 | * | 9/2002 | Liu et al. ....................... 707/10 |
| 6,484,177 B1 | * | 11/2002 | Van Huben et al. .......... 707/10 |
| 6,535,881 B1 | * | 3/2003 | Baclawski .................... 707/10 |
| 6,558,431 B1 | * | 5/2003 | Lynch et al. ................. 715/513 |
| 6,611,835 B1 | * | 8/2003 | Huang et al. .................. 707/10 |
| 6,654,747 B1 | * | 11/2003 | Van Huben et al. .......... 707/10 |
| 6,693,652 B1 | * | 2/2004 | Barrus et al. ............... 345/838 |
| 2003/0220998 A1 | * | 11/2003 | Jennings et al. ............ 709/224 |

OTHER PUBLICATIONS

David Crowder and Rhonda Crowder, "Mastering Macromedia Dreamweaver 3", SYBEX, 2000, pp. 5, 203–474.*

* cited by examiner

Primary Examiner—Bunjob Jaroenchonwanit
(74) Attorney, Agent, or Firm—Law Offices of Albert S. Michalik, PLLC

(57) ABSTRACT

A system and method for designing web pages that enables web designers to place hyperlinks to web pages independent of any hierarchical relationship between the pages of the website. A link bar element is provided within a description of the website. The link bar element includes a persistent set of links, each link corresponding to one of several content files. One or more of the content files may be a web file. The link bar element is associated with at least one web file by including a link bar name in the at least one web file. In addition, other link bar information is stored in the web file and a description of the website is stored in a description file separate from the at least one web file that is associated with the link bar element. The description file includes an identifier for the link bar node and the one or more links. Based on the link bar element included within the web file, the description file is translated into additional instructions configured to cause a browser to create web links on a corresponding web page. The web links correspond to the one or more links in the link bar element.

28 Claims, 12 Drawing Sheets

| ID OF ELEMENT (302) | URL (304) | LABEL (306) | TIME STAMP/PARENT (308) |
|---|---|---|---|
| 1000 | INDEX.HTM | HOME | <TS> |
| 1001 | PAGE1.HTM | PAGE1 | <TS> |
| 1002 | PAGE2.HTM | PAGE2 | <TS> |
| 1003 | PAGE1_1.HTM | PAGE1_1 | <TS> |
| 1004 | PAGE2_1.HTM | PAGE2_1 | <TS> |
| 1005 | PAGE2_2.HTM | PAGE2_2 | <TS> |
| 1006 | - | S | SEQUENCE 1 |
| 1007 | PAGE1_1.HTM | S1 | 1006 |
| 1008 | PAGE2_1.HTM | S2 | 1006 |
| 1009 | PAGE2_2.HTM | S3 | 1006 |

FIG. 3

```
<!--WEBBOT
    BOT="NAVIGATION"
    S-TYPE="        "
    S-ORIENTATION="HORIZONTAL"
    S-RENDERING="HTML"
    B-INCLUDE-HOME="FALSE"
    B-INCLUDE-UP="FALSE"
    U-PAGE="SID:1006"
    S-BTN-NML= "<A HREF="#URL#"
    TARGET="#TARGET#"STYLE="
    {TEXT-DECORATION: NONE;}">#LABEL#</A>"
    S-BTN-SEL="<B>#LABEL#</B>"
    S-BTN-SEP="&NBSP;&BULL;&NBSP;"
    S-BAR="DOTS"
STARTSPAN -->

ENDSPAN -->
```

SYSTEM AND METHOD FOR FACILITATING THE DESIGN OF A WEBSITE

FIELD OF THE INVENTION

The present invention relates to the designing of a website, and more particularly to linking pages of a website.

BACKGROUND OF THE INVENTION

Today, it is possible to share multiple page documents and collections of documents with others in a networked environment, such as the World Wide Web (hereinafter simply referred to as the "web"). However, linking these collections of documents in a useful manner may be a tedious task. Typically, linking is done by providing links on each web page to other web pages or documents. A user may click on one of the links appearing on the web page in a browser to navigate to the other web page or document. In order to easily navigate the collection of documents without causing confusion or being cumbersome to the user, the links shown on each web page should allow navigation of the website with a reasonable number of mouse clicks, and without displaying an overwhelming number of links on any one web page.

The creation of the links on each web page may be performed by a web author or designer by inserting a URL (Uniform Resource Locator) for each link appearing on the web page. However, creating and designing a web page by typing in URLs is typically tedious, error prone and very time consuming. In addition, updating links that are scattered across several interconnected web pages can be a real chore. Therefore, the web designer may choose to use a website creation tool, which, among other features, provides a user interface (UI) for creating web pages. One popular website creation and management tool is FrontPage® 2000, developed and licensed by Microsoft Corporation, Redmond, Washington.

Some website creation tools allow a web designer to use menus and commands to design a website's overall structure (e.g. a web page hierarchy) in a navigation view, and to provide a separate page view in which to create and lay out a web page. An object (e.g., a navigation bar) may be defined in the page view to quickly and conveniently create "live" links to other web pages based on the website structure. Such live links are defined based upon the hierarchical relationship of the web pages. For example, the live links may point to one or more web pages above the selected web page (e.g., a parent or home page), one or more web pages on the same level as the selected web page, (e.g., sibling pages), or one or more web pages below the selected web page (e.g., a child page). These live links are then displayed as part of the web page when a user views the web page via a browser.

While the navigation bar greatly simplifies the creation of certain links, this mechanism is not ideal. For example, the navigation bar is relative to the web page on which it is used, e.g., a link to a parent means one thing on pages with the same parent but something else on pages with a different parent. Moreover, current web design tools require a web designer to hierarchically define the website structure and associate links based on the hierarchical structure. Still further, the web designer typically has to switch between the navigation view and the page view to create the hierarchical website structure and the respective web pages, which can cause confusion and inconvenience the website designer, who must remember the hierarchical website structure when linking the web pages.

Given the limitations in the prior art web design tools, there is a need for a more flexible and efficient way to design websites and their pages.

SUMMARY OF THE INVENTION

Briefly described, the present invention provides a system and method for designing a website that enables web designers to place hyperlinks to web file content (e.g., web pages) independent of any hierarchical organization of the website's content. To this end, a link bar element is provided that includes a link bar node and one or more links, each link corresponding to one of several content files, e.g., web pages. The link bar element is associated with at least one web file, and the link bar element includes a link bar name that is included in the at least one link bar web file. The link bar element may be stored in a description file that is separate from the at least one link bar web file. In addition, a link bar may be created independent of a web page for insertion into one or more web pages at a later time. The description file includes an identifier for the link bar node and the one or more links. In addition, the one or more links have a uniform resource locator (URL) therein. Based on the link bar element named within the link bar web file, the description file is translated into additional instructions configured to cause a browser to create web links on a corresponding web page. The web links correspond to the one or more links of the link bar (i.e., links to the link web files).

A data structure is stored on a computer-readable medium. The data structure includes several records, each record describing an element in a website description. The records include a first record type describing a web file with the website and a second record type describing a link bar. The second record type includes a link bar node entry and at least one link entry, the at least one link entry defining a hyperlink to a content file.

The content files include HTML files, graphics files, XML files and the like. As such, one or more content files may be web files (i.e. HTML files, XML files) and may be related in a hierarchical website structure with several parent content files, each having one or more sibling content files. In this embodiment, the link bar element may have one link associated with a first sibling content file of a first parent content file and another link associated with a second sibling content file of a second parent content file. Thus, links to the content files may be provided in one link bar independent of a hierarchical relationship between the content files at the website.

These and other aspects of the invention, together with the benefits and advantages realized, will become apparent from a reading of the following detailed description in conjunction with the drawings, in which:

BRIEF DESCRIPTION OF THE DRAWINGS

FIG. 3 is a graphical representation of one embodiment of a file used by the illustrative web design system implementing the present invention;

FIG. 7 is an illustrative sample of a bot created and used by the illustrative web design system for implementing the present invention;

DETAILED DESCRIPTION
Exemplary Operating Environment

Figure 1:
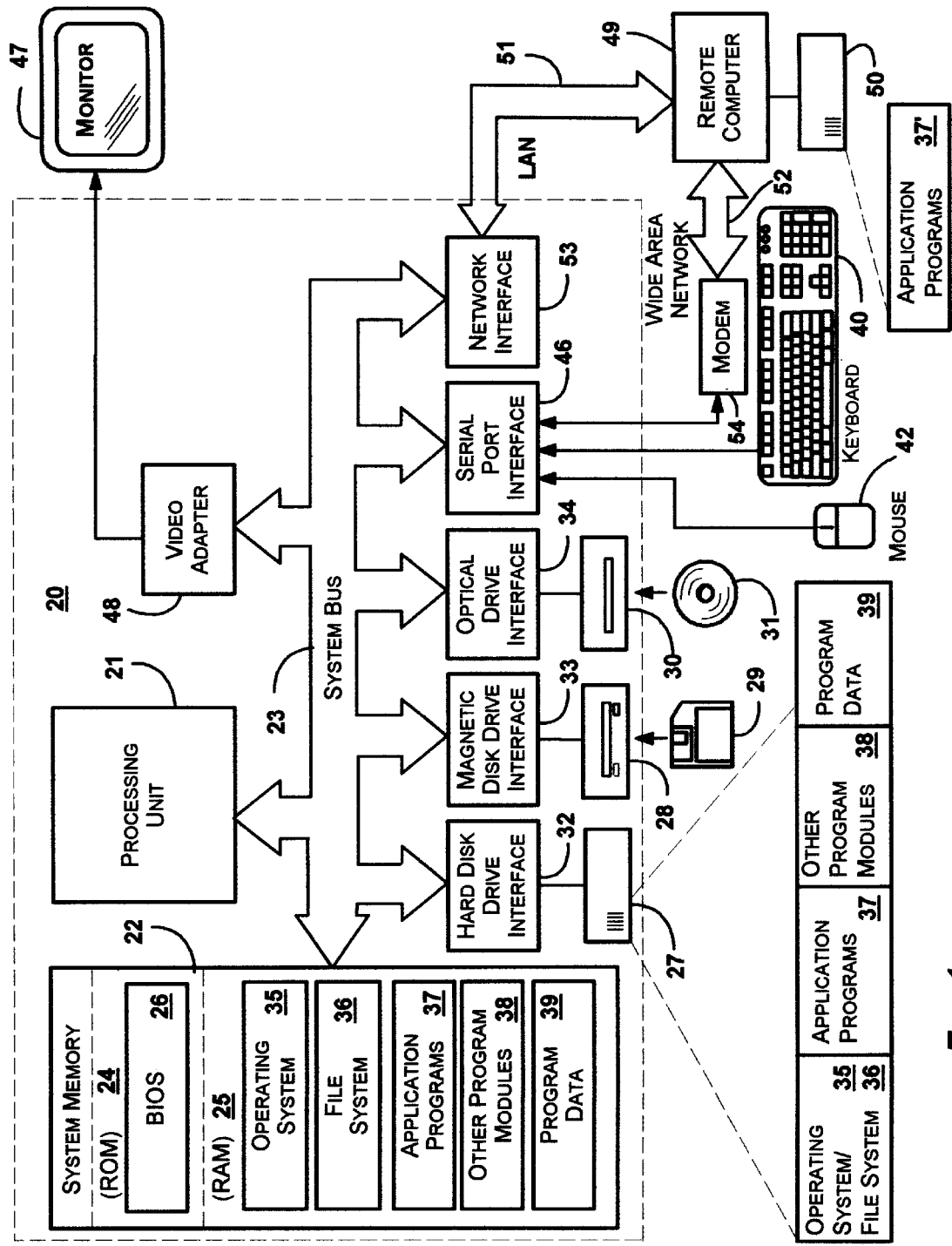
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably the Windows® 2000 operating system). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Illustrative Web Design System

Briefly, in accordance with the present invention, a web design system is provided that enables web designers to place a persistent set of links to content files on one or more web pages, the links being provided as a group independent of any hierarchical relationship between the content files and/or a relationship between the links and the page or pages upon which the links are placed. As used herein, placing the links on the web pages "independent" of a relationship means that the links may have a hierarchical relationship with one another or the page upon which they are placed, but their grouping is not based upon that relationship. To this end, a navigation link bar (hereinafter referred to as a "link bar") is provided for the web designers. The web designers use the link bar to associate a persistent set of content files irrespective of the website structural relationship between the content files. The links are "persistent" in that the same set of links appears on each page upon which the link bar is placed. However, as is described further below, the set of links may be edited, such as by adding or deleting links from the link set.

As an example, a link may be created in which a child page of one parent page in what is considered a hierarchical website may be associated with a child page of another parent page, and/or with the other parent page. The web designer may include the created link bar in multiple web pages, each of which will displays the same links, regardless of the website hierarchy and/or the web page on which that link bar's links appear. Thus, the link bar provides a persistent set of links that are grouped independent of a website hierarchy.

Figure 2:
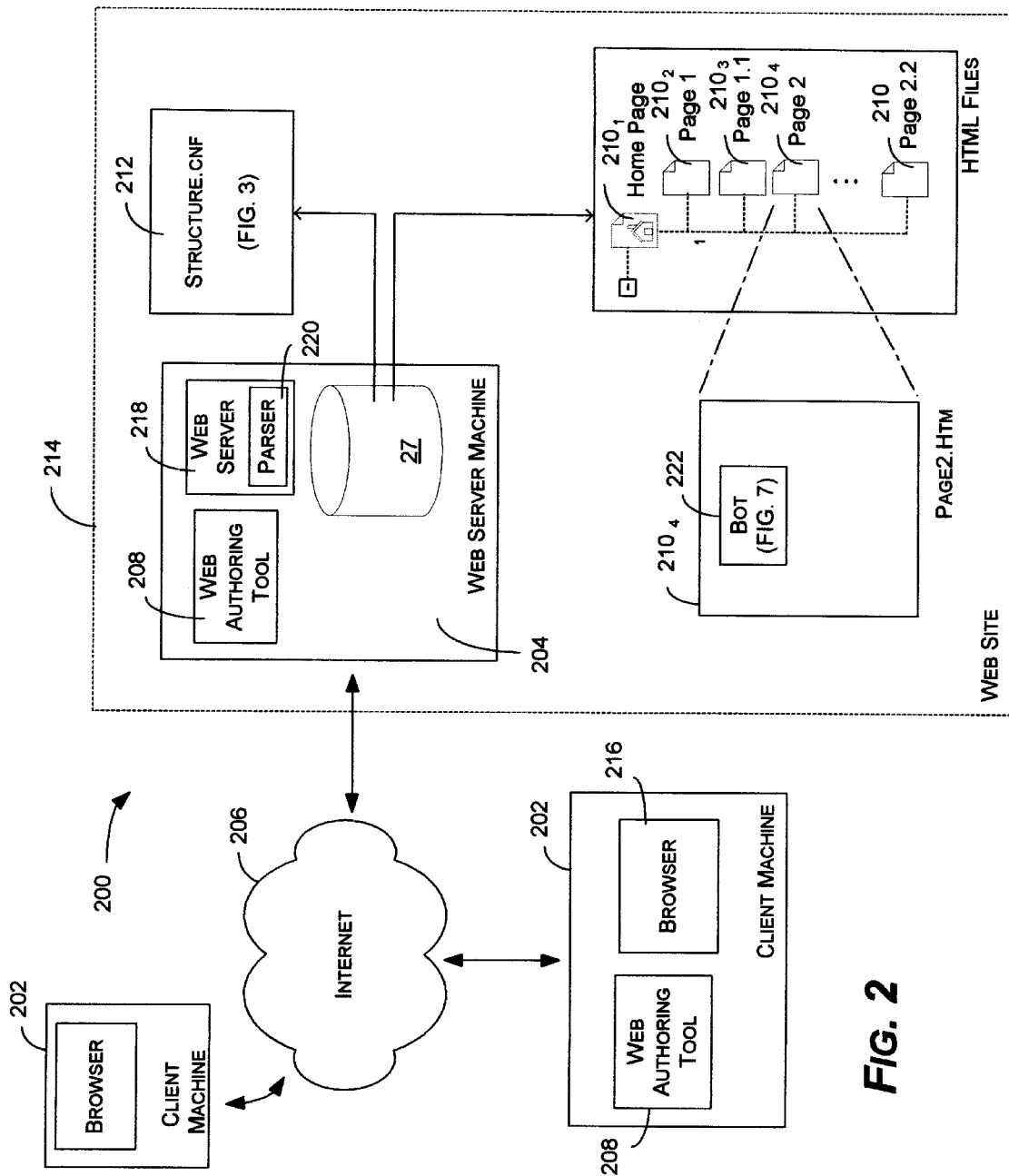
FIG. 2 is a functional block diagram generally representing an illustrative web design system for constructing a website in accordance with one implementation of the present invention.

FIG. 2 is a functional block diagram that, together with the following discussion, provides a brief, general description of an illustrative system for designing and linking web content (e.g., pages) of a website. In general, anything that may be identified by a URL or the like may be linked in accordance with the present invention, however for purposes of simplicity the linking of pages of a website will be described herein. The web design system 200 may include a client machine 202 (e.g., the computer system 20) coupled to a web server machine 204 (e.g., the remote computer 49). The client machine 202 and the web server machine 204 communicate with each other through the Internet 206. Alternatively, the client machine 202 and the web server machine 204 may be connected through a local area network or the like (e.g., in an Intranet).

A web design tool 208 may comprise an application residing on the client machine 202 and/or the web server machine 204. The web design tool 208 is responsible for creating websites and and/or linking web pages (e.g., HTML Files) $210_{1-n}$, along with a description file 212 for identifying each of the several HTML Files and for describing the relationship between them in accordance with one implementation of the present invention. Both the HTML Files $210_{1-n}$ and the description file 212 may be stored on the hard disk 27 of the web server machine 204 or may be stored on any other storage device coupled to the web server machine 204. In addition, the web design tool 208 may create a bot 222 in one or more of the HTML files $210_{1-n}$ that includes text which may reference a navigation link bar described in the description file 212. In summary, as is described further below, the bot 222 includes additional instructions (e.g., for formatting) for the description file 212. The additional instructions are expanded out into the content of the page at the time the page is saved to the server. Alternatively, in accordance with another embodiment, the instructions may be expanded out at the time the page is requested by a client. An exemplary bot 222 is generally illustrated in FIG. 7 and is described further below.

As can be readily appreciated, if the web design tool 208 resides on the client machine 202, the HTML Files $210_{1-n}$ and the description file 212 may be sent to the web server machine 204, such as via the File Transfer Protocol (FTP) over the Internet 206 or as a file copy over the optional Local Area Network. A user may enter a uniform resource locator (URL) in a browser 216 or the like on the client machine 202 to access website 214. The HTML files representing the website 214 are served to a browser 216 by the web server machine 204 and viewed as corresponding web pages in the browser 216.

The web server machine 204 further includes web server software 218 for serving the HTML Files $210_{1-n}$ to the client machine 202 upon request. In addition to conventional features, the web server software 218 also includes a parser 220 responsible for parsing the HTML Files $210_{1-n}$ and reading the description file 212 in accordance with the present invention.

The bot 222 and description file 212 allow the web design system 200 of the present invention to provide links on a web page independent of the website's hierarchical structure (i.e., the relationship between the HTML files 210). In keeping with the present invention, the web design system 200 allows different web pages to display the same list of links using the same link bar.

FIG. 3 is a graphical representation of one embodiment of the description file 212 used by the illustrative web design system 200 implementing the present invention. For ease of explanation, a field descriptor bar 300 is shown above the corresponding columns of the description file 212. The field descriptor bar 300 provides a textual field description for each of the associated columns in the description file 212 and is not typically included in the description file 212.

Each record (i.e., row) in the description file 212 is associated with one element of the website 214, such as a content file or a link bar. In the example shown, each record includes a first field 302 (corresponding to a first column), a second field 304 (corresponding to a second column), a third field 306 (corresponding to a third column), and a fourth field 308 (corresponding to a fourth column). The first column 302 stores a unique identifier for the element (i.e., HTML File) associated with the record. The second column 304 stores the URL (if any) associated with the element. For example, the URL may reference an HTML file, a graphics file, or the like. The third column 306 stores a label, such as a textual description for the element. For example, a typical label may be the title of a web page or an identifier of a link bar.

The fourth column 308 stores one of several different items depending on the type of element, as will be explained further below. For example, if the entry refers to a content file $310_a$–$310_f$, the fourth column 308 may store a time stamp associated with the corresponding content file. Alternatively, if the entry is a link bar entry 312, the fourth column 308 may store one of two items, depending on whether the link bar entry 312 is a link bar node entry 314 or a link entry 316. If it is a link bar node entry 314, the fourth column may store one or more words (e.g., "SEQUENCE 1") to name the link bar. As will be described further, the link bar node entry 314 allows multiple links to the same content file 310 to be placed in more than one link bar without creating an ambiguous reference to the same content file. If the entry is a link entry $316_a$–$316_c$, the fourth column identifies the parent, such as with the identifier of the link bar node entry 314. In general, a "tree" data structure is defined in this datafile.

Turning now to the specific entries in FIG. 3, entry 310a describes the Home Page which has an identifier of "1000", a URL of "index.htm", a Label defined as "Home" and a time stamp "<TS>". The next five content entries 310b–f, labeled "Page1", "Page2", "Page1-1", "Page2__1", and "Page2__2" in column three, respectively, have a URL in the second column which corresponds to the HTML file (i.e., "Page1.htm) and a consecutive identifier beginning with 1001 in the first column. The link bar entries 312 include one link node entry 314 and three link entries 316ac. The link node entry 314 has an identifier of "1006" in first column 302, no URL is stored in the second column 304 because the node does not have an associated HTML file, a label of "S" is stored in the third column 306, and the text "SEQUENCE 1" is stored in the fourth column 308 representing the name of the link bar node. The three link entries 316a–c correspond to links 430a–c in a link bar tree 820 illustrated in FIG. 8 and described further below. The link entries 316a–c have consecutive identifiers 1007–1009 stored in the first column 302. The second column 304 of each link entry 316a–c includes an identifier such as a URL, for the content file referenced by that particular link entry 316a–c. For instance, link entry 316 points to "Page1__1.htm". In addition, the link entries 316a–c have labels, "S1" "S2" and "S3", stored in the third column 306, respectfully, and because each is a link in the same link bar node, the fourth column 308 stores a value of "1006" which identifies that the link entry is associated with the link node entry 314. Web pages incorporating links or sequences in accordance with the present invention may also include conventional links referencing individual content files created using conventional methods.

Figure 4:
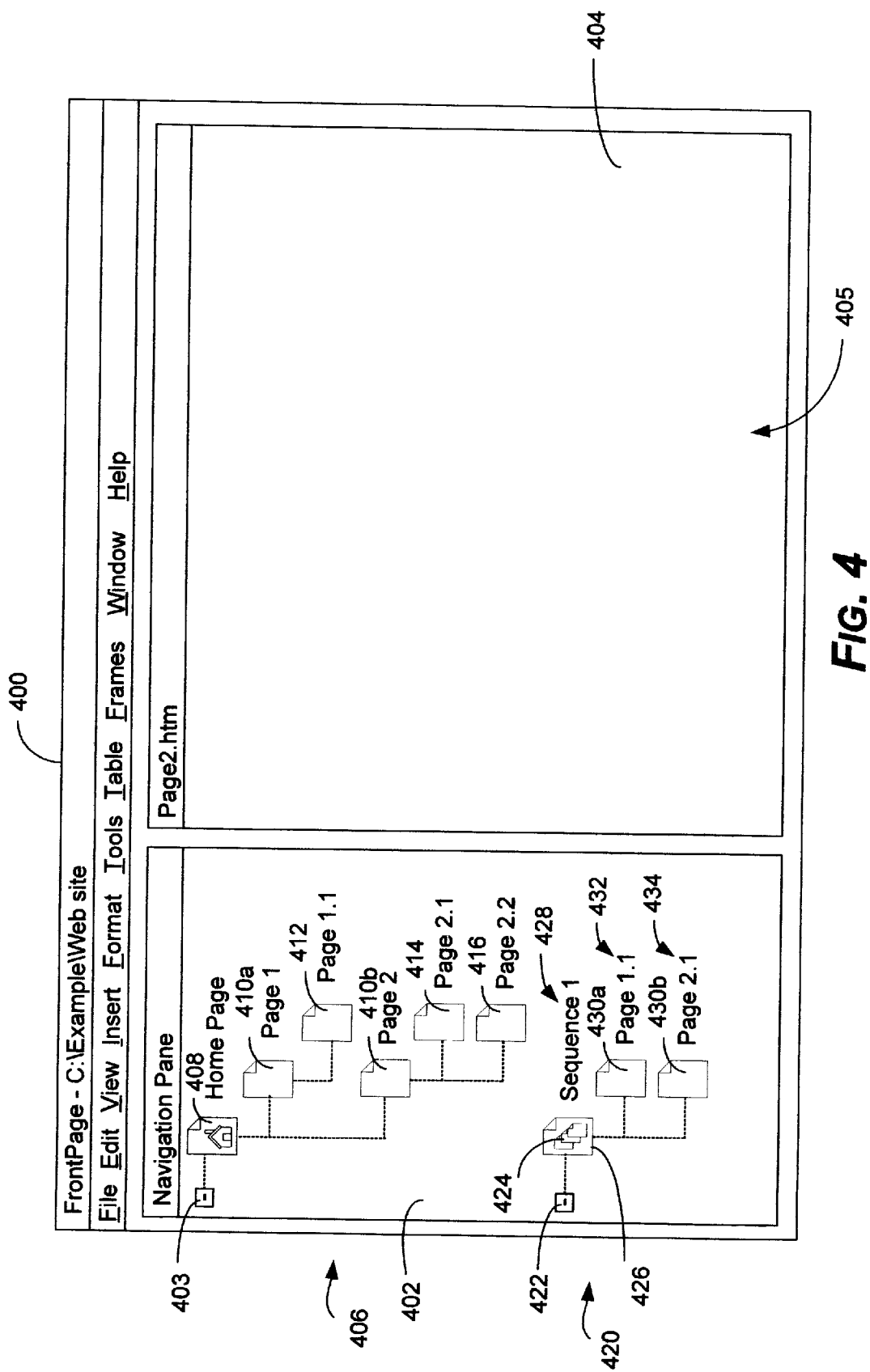
FIG. 4 is a graphical representation of one embodiment of a user interface for a web design tool showing a link bar in a navigation view in accordance with the present invention.

FIG. 4 is a graphical representation of one embodiment of a user interface for the web design tool 208 used in the web design system for placing links in accordance with the present invention. The web design tool 208 provides a web designing window 400 that includes a navigation view 402 for graphically displaying the HTML files and the link bars, and a page view 404 for displaying a rendered version of a selected HTML file. The page view 404 may represent some or all of a selected HTML file as it would appear in a browser. The navigation view 402 provides a tree-type hierarchy of the website 214 (hereinafter referred to as the navigation tree 406) which is collapsible and expandable via a toggle object 403. The navigation tree 406 is shown in the expanded mode and thus shows the HTML files available for the website.

As described earlier, the HTML files may be defined in an hierarchical manner using the web design tool 208. A parent HTML file 408, such as the Home Page, may have one or more HTML files immediately below the Home Page which are designated as first level HTML files $410_a$–$410_b$. Each first level HTML file $410_a$–$410_b$ may also have one or more HTML files immediately below it (i.e., children files), designated as second level HTML files 412. As can be appreciated, the second level HTML files and any other subsequent level HTML files may likewise have HTML files immediately below their levels (i.e., children to the children and so forth). However, in order to simplify the discussion, the present discussion will only use three levels of HTML files. HTML files that reside at the same level and depend from the same upper level HTML file are referred to as siblings. One HTML file that resides at a level below another HTML file is referred to as a child of the other HTML file (i.e., parent).

Thus, as shown in the navigation tree 406, there are two first level HTML files 410a–b below the Home Page 408 ("Page 1" and "Page 2"). "Page 1" has one child HTML file 142, "Page 1.1". "Page 2" has two children HTML files 414 and 416, "Page 2.1" and "Page 2.2", Pages 2.1 414 and 2.2 416 are thus sibling pages. As explained above, current web design tools provide navigation bars that are based upon a website hierarchy that does not allow one HTML file to be a child of more than one HTML file. Thus, placing a link to a particular HTML file on two different pages, if they are not properly related to the linked page, is not currently possible (except for "home" link). The present invention, however, provides a link bar that defines a persistent set of links so that the link bar may be placed on any page in the hierarchy, and the persistent set of links are provided.

To facilitate the use of link bars, the navigation view further includes a link bar tree 420. The link bar tree 420 is displayed with a toggle object 422 in the expanded mode. In one embodiment, if the link bar tree is not already provided, a right click on the mouse while the cursor is in the navigation pane 402 provides a mechanism (e.g., contextual menu) for creating the link bar tree 420. A link bar node 426 having a link bar icon 424 appears in the link bar tree 420. The link bar node 426 may be displayed with a default link bar name 428, such as "Link Bar 1". The web designer may then graphically select the link bar name 428 and modify it. In this example, the link bar name 428 is "Sequence 1". In general, the set of links defined within the link bar may alternatively be referred to as a "sequence" to denote that the links are a list of links and not based on any hierarchical relationships. The sequence may then appear horizontally or vertically on the web pages associated with the sequence, and in various textual or graphical styles according to the bot associated with the link bar. In general, only the link set information is stored globally in the link bar itself, display options can be chosen independently for each page via the bot.

After creating the link bar node 426, in one implementation the web designer may graphically select any of the HTML files appearing in the navigation tree 406 and drag the corresponding HTML file to the link bar icon 424. This creates a link 430 associated with the link bar node 426. For example, links 430a and 430b are shown under the link bar node 426, corresponding to "Page 1.1 432" and "Page 2.1 434", respectively. Thus the link bar tree 420 graphically displays the link bar node 426 named "Sequence 1" having two associated links, "Page 1.1" and "Page 2.1". Additional HTML files may also be inserted under the link bar node 426.

As explained above, the page view 404 of the user interface displays a rendered version of an HTML file selected from the navigation view 402. The page view 404 simulates the web page as it would appear in the browser by interpreting the specified HTML file. In this example, the page view 404 displays the rendered Page2.htm (corresponding to page 2(410b) in the navigation tree 406 which only has standard content 405. Because the illustrative link bar tree 420 appears as a separate entity in the navigation view 402 and has not been placed in the navigation tree 406, none of the HTML pages yet include the link bar represented by link bar node 426.

Figure 5:
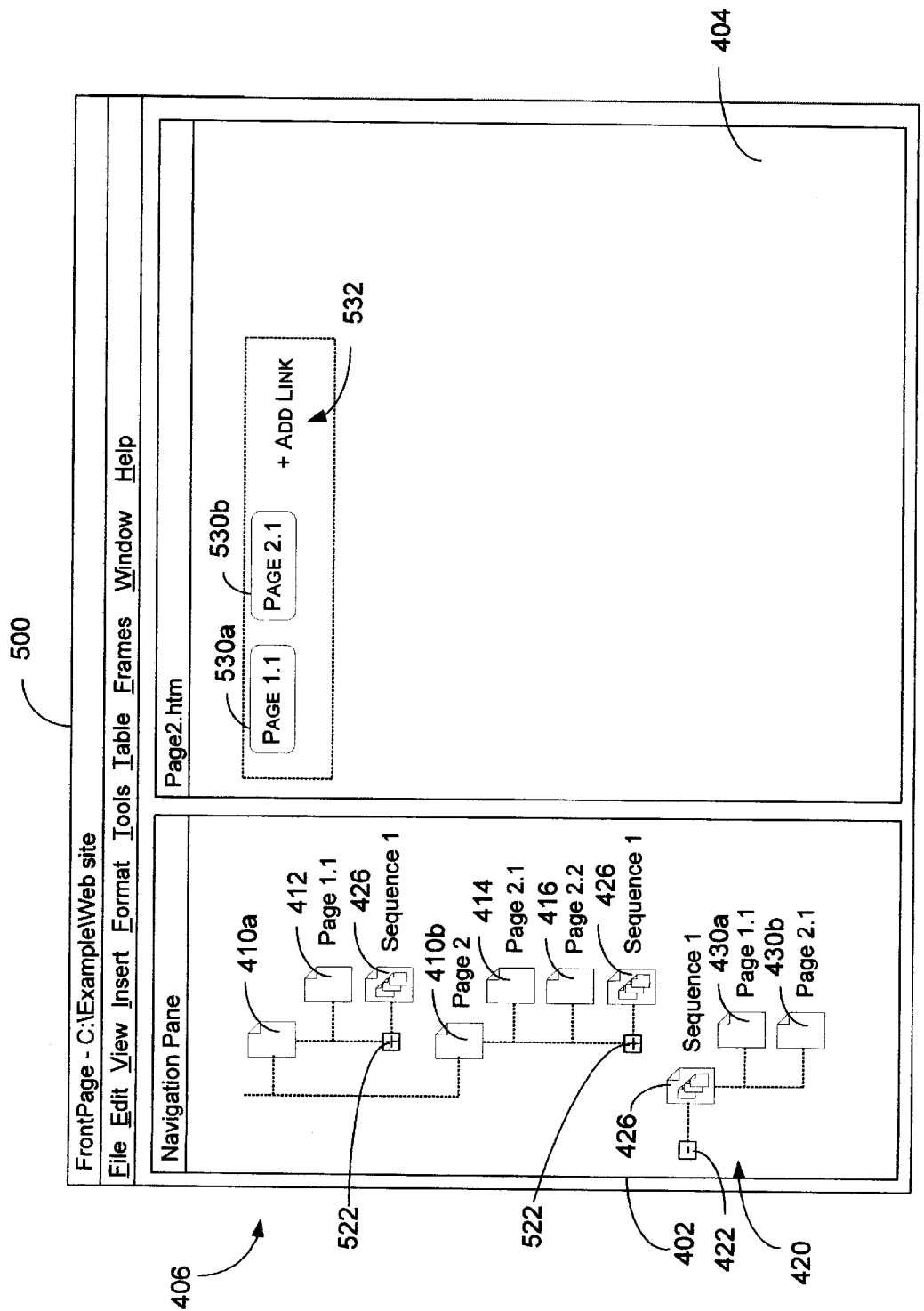
FIG. 5 is a graphical representation of one embodiment of a user interface for the web design tool showing the link bar being associated with web files in the navigation view and a corresponding illustrative web page in a page view.

FIG. 5 is another graphical representation of the user interface for the web design tool 208 showing the link bar node 426 being associated with HTML files in the navigation view. As is described further below, by associating the link bar node 426 with an HTML file, the links associated with the link bar node 426 are displayed on the page associated with the HTML file. To associate the link bar node 426 with an HTML file, in one embodiment, a web page designer drags a representation of the link bar node 426 to one or more of the HTML files $410_a$–$410_b$ (e.g., "Page 1" and "Page 2") displayed in the navigation tree 406. The link bar node 426 is represented as a child of the HTML files with which it is associated. As shown in FIG. 5, the navigation tree 406 displays the link bar tree 420 in a collapsed manner, as designated by toggle object 522. Alternatively, once a link bar node is created in the navigation view, the link bar node may be dragged to the page view which results in the link bar node being associated with the HTML File being displayed in the page view.

When one of the HTML files (e.g., $410_a$ or $410_b$) having a link bar therein is displayed in the page view 404, a link bar representation 500 associated with the link bar node 426 is displayed in the page view area. The link bar representation 500 includes links $530_a$ and $530_b$, corresponding to the links that are located in the link bar node, (i.e., HTML Files 412, 414), respectively. As will be described further with reference to FIG. 7, the link bar may have a formatting theme or other display attributes applied to it. For example, FIG. 5 illustrates the link bar having graphical buttons, rather than a textual link.

Even though only one link bar is shown in FIG. 5, one skilled in the art will appreciate that additional link bars may be created as described above. In addition, the same link may be specified in different link bars. This flexibility provides web designers web with fewer constraints when arranging navigational links for websites.

If the web designer wishes to add an additional link to the link bar, the web designer may use the drag and drop method in the navigation view 402 as described above. In another embodiment, the web designer may select a "+ Add Link" hyperlink 532 that is displayed with the link bar representation 500 when the web page is displayed in the page view 404. As will be described below, the "+ Add Link" button does not appear when the web page is normally rendered for viewing by a client user accessing the website.

Figure 6:
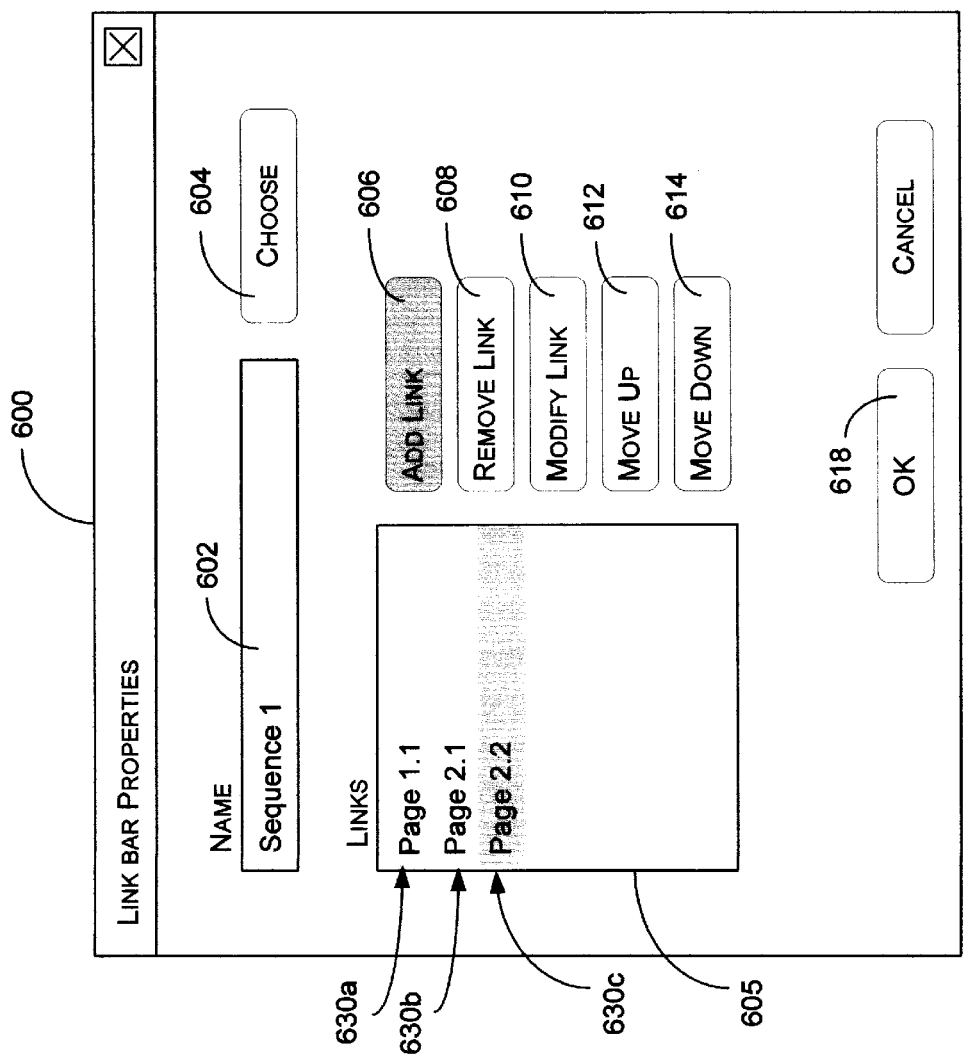
FIG. 6 is a graphical representation of a user interface for the web design tool showing an alternate embodiment for adding a link to the link bar in accordance with the present invention.

Selecting the "+ Add link" hyperlink 532 invokes an alternative user interface for adding a link. The alternative user interface is shown in FIG. 6. In the alternate user interface, a link bar window 600 includes a link bar name field 602 for displaying and/or modifying a link bar name. If the link bar window 600 is accessed through the "+ Add Link" hyperlink 532, the current link bar associated with the "+ Add Link" hyperlink 532 appears as the default name in the link bar name field 602 (e.g. "Sequence 1"). Otherwise, the web designer may choose any existing link bar or create a new link bar by selecting the choose button 604. Because "Sequence 1" is the current link bar, a links window 605 first displays the links 630a, 630b which correspond to the already-defined links 430a, 430b displayed in the link bar tree 420 of FIG. 4 (e.g. "Page 1.1" and "Page 2.1"). An add link button 606 allows additional links to be added. Triggering the add link button 606 may open another window that presents the web designer with a list of links from which to chose or an entry field in which the web designer may type the URL for the new link. As mentioned earlier, the URL may reference any type of content available for display on a web page, such as HTML files, graphic files, and the like. As shown, the web designer has added link 630c, "Page 2.2", which is now displayed in the links window 605 along with previously-defined links 630a, 630b.

The link bar window 600 may optionally include a remove link button 608 for deleting a link from the link bar, a modify link button 610 for modifying an existing link (i.e., name, URL, or the like), a move up button 612, and a move down button 614. The move up and move down buttons may allow the web designer to specify an order for the links 630 as they appear on the web page when rendered. Once all modifications to the link bar have been completed, the web designer may select an OK button 618 to save the link bar properties.

Figure 8:
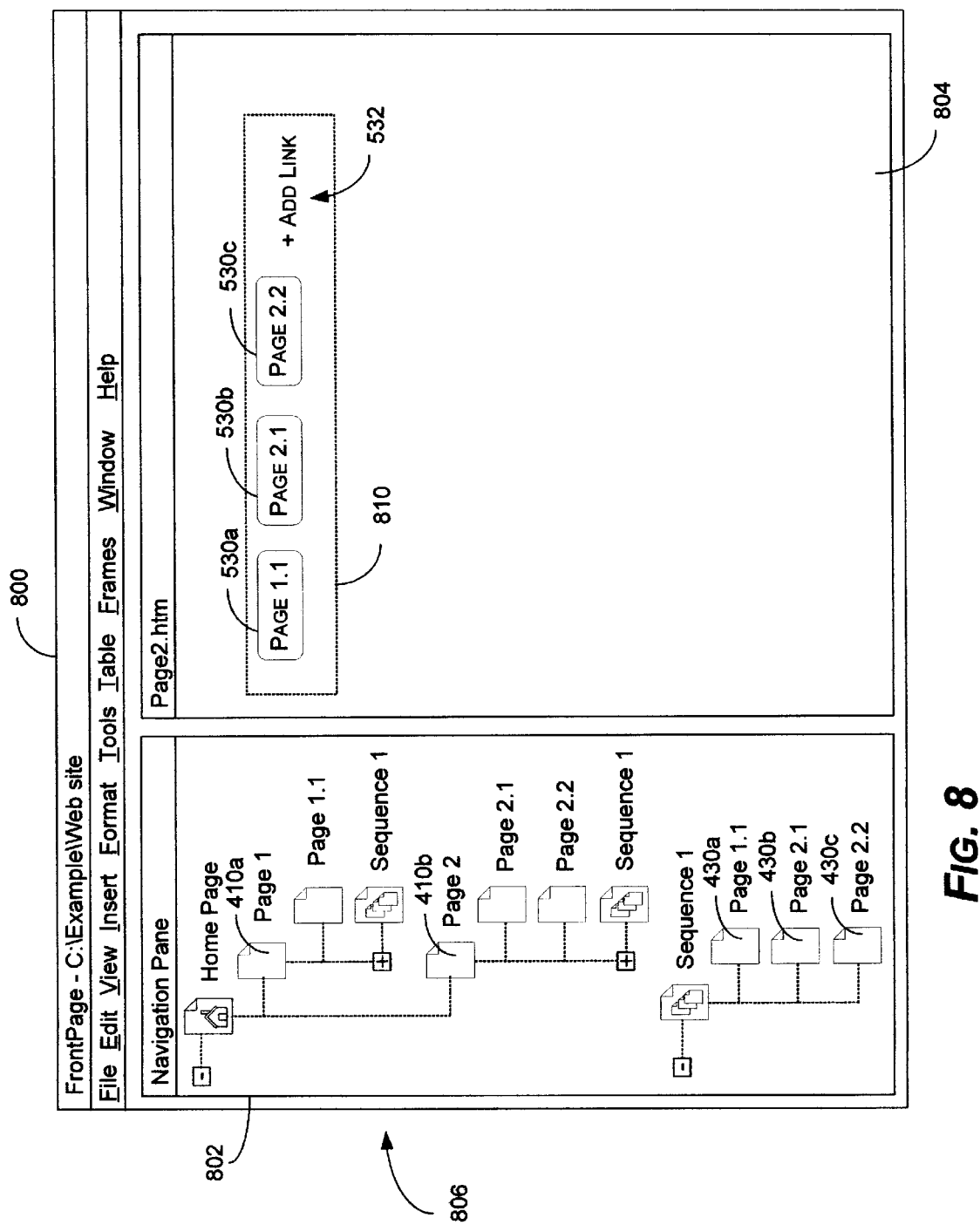
FIG. 8 is a graphical representation of a navigation view and a page view showing results of adding the link to the link bar in FIG. 6.

FIG. 8 is a graphical representation of a navigation view 802 and a page view 804 showing the result of adding another link to the link bar as described with reference to FIG. 6. Again, a web designing window 800 includes a navigation view 802 and a page view 804. The link bar tree 820 now displays a new link 430c (e.g. "Page 2.2") along with the previous links 430a, 430b. Because HTML file 410b, "Page 2", has the link bar under its node, the page view 804 for the rendered Page2.htm file correspondingly displays a link bar 810 having each of the links defined in the link bar node, including the additional link button 530c.

Figure 9:
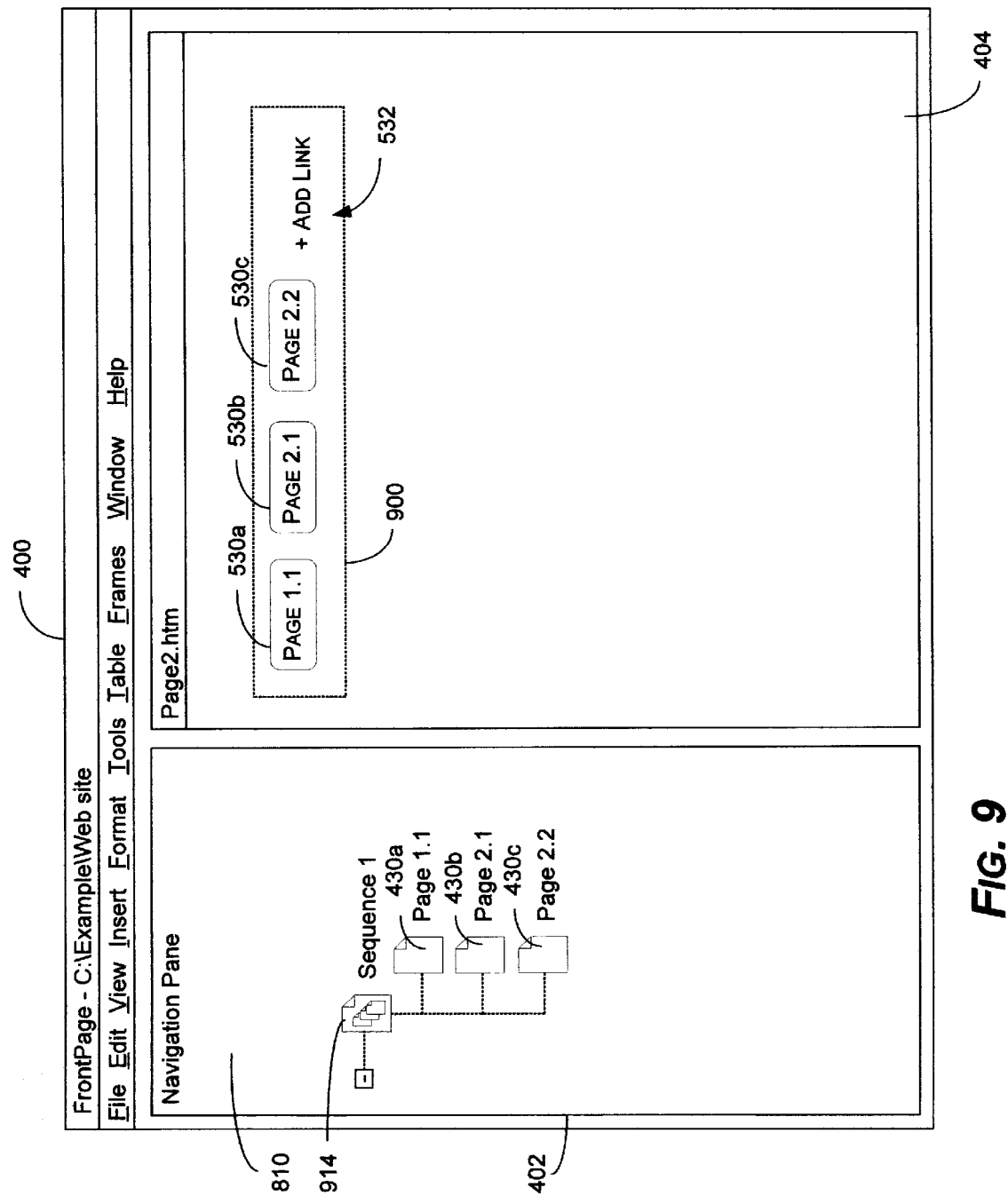
FIG. 9 is a graphical representation of an alternate embodiment of a navigation view.

FIG. 9 is a graphical representation of an alternative embodiment of the invention in which the navigation view 402 does not describe the several website elements in a hierarchy, but rather in a single level (i.e., without parent/child relationships). In this embodiment, only sequences are shown in the navigation pane. For the example shown in FIG. 9, the sequence 1 and its associated links are shown. The link bars created in accordance with this aspect of the present invention permit link bars to be formed without a hierarchical structure. The link bars, such as Link Bar 914, may be created and maintained in the same fashion as that described above. For example, the HTML Files 430a, 430b, 430c may be dragged into a link bar node 914. The link bar node may then be dragged into HTML files or into a page that is being edited, so as to be displayed as a link bar representation 900 in one of the web pages.

Figure 12:
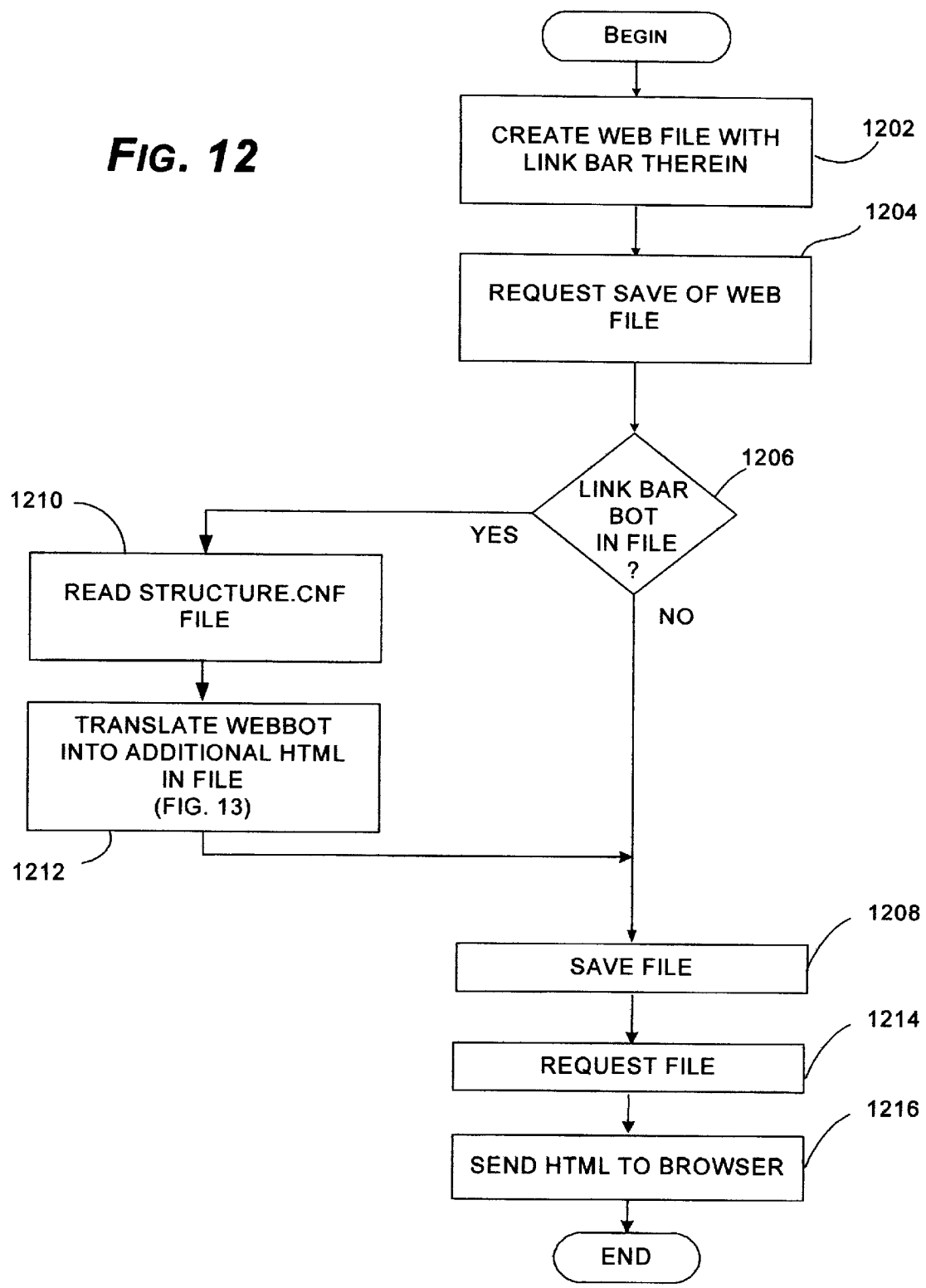
FIG. 12 is a logical flow diagram which generally describes a process performed by the illustrative web design system to serve a web page to a browser in accordance with one implementation of the present invention.
Figure 13:
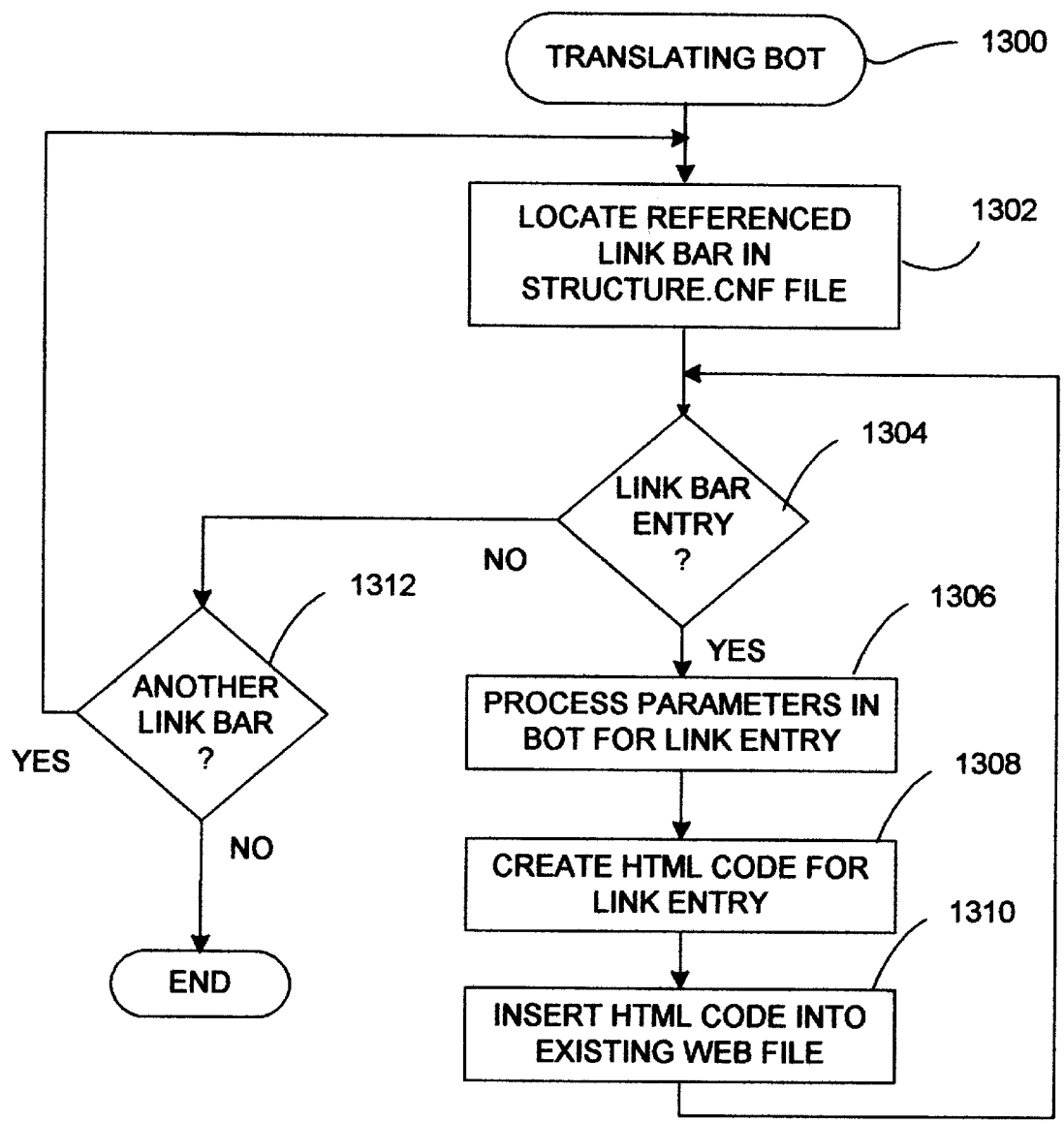
FIG. 13 is a logical flow diagram which generally describes a translation process for translating link bar information into HTML instructions suitable for use in FIG. 12.

FIG. 7 is an illustrative sample of a bot created and used by the illustrative web design system implementing the present invention to cause the links in a link bar to be appropriately rendered by the client browser 216. The bot may be a code or comment, which, when interpreted by the web server 218, causes the generation of appropriate HTML code to display the link bar within the web page in the format desired by the web designer. The sample bot 222 shown in FIG. 7 is written as a comment in the corresponding HTML file. As is illustrated in FIGS. 12 and 13 and described below, when the file is saved, or at the time when web data is updated and there are pages with dependencies on that data, the web server 218 parses the HTML file and translates the bot into the appropriate HTML instructions based on information stored in the description file. The translated HTML instructions are sent by the web server 218 to the browser along with other HTML instructions in the HTML file. As is also described further below, by using bots, the same persistent set of links (i.e., a link bar) may be provided on several different pages, but with different formatting instructions (e.g., horizontal or vertical, buttons or text).

Figure 10:
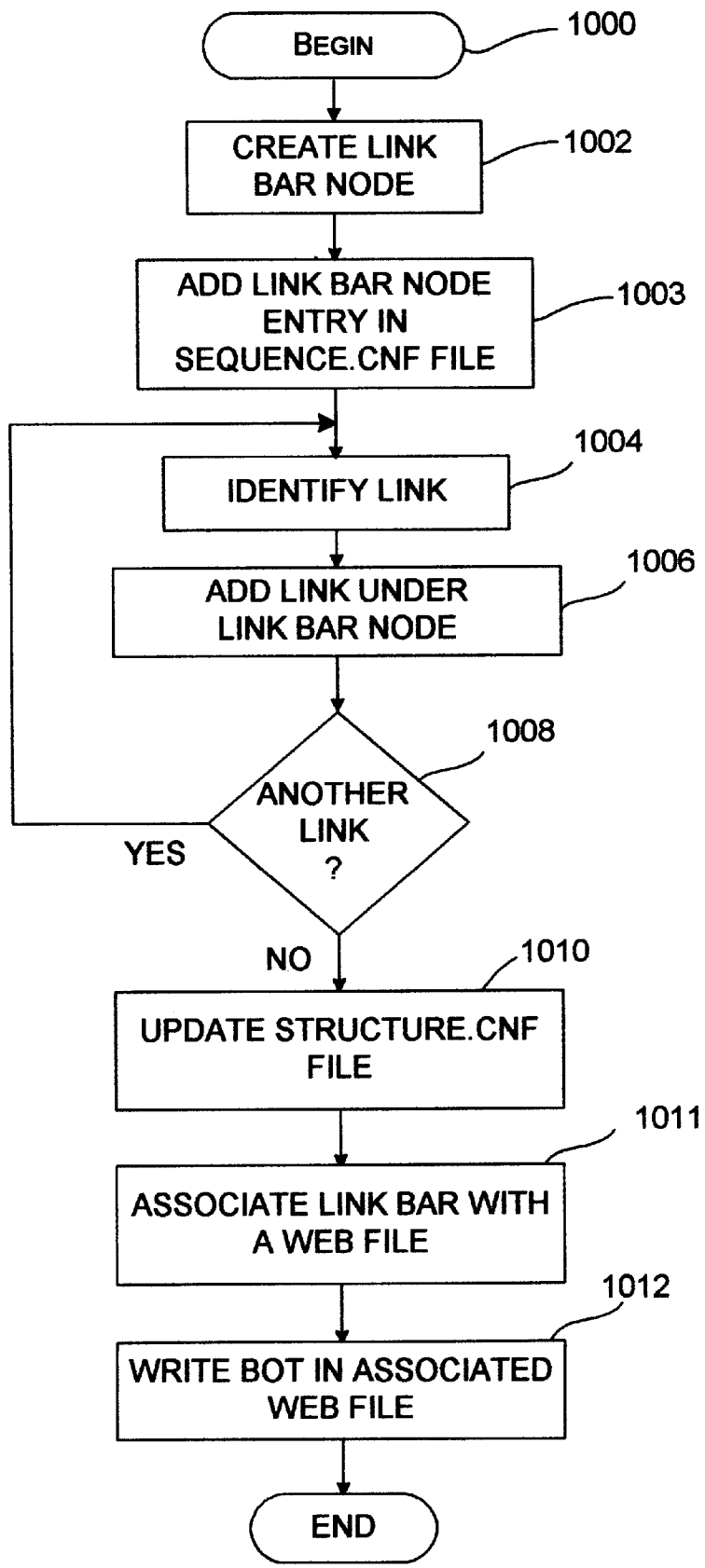
FIG. 10 is a logical flow diagram which generally describes a creation process performed by the illustrative web design system to create a link bar in accordance with the present invention.

FIG. 10 is a logical flow diagram which generally describes a creation process performed by the illustrative web design system to create a link bar in accordance with the present invention. The process begins at block 1000, where a web designer chooses to create a link bar, and proceeds to block 1002.

At block 1002, a link bar node is created. As described above, the link bar node may be created using a contextual menu or the link bar window shown in FIG. 6. After creating the link bar node, the process proceeds to block 1003.

At block 1003, a new link bar node entry is added to the description file 212. As described above, the link bar node entry defines the link bar as an entity in the website structure, and, additionally may identify each link bar entry associated with the link bar node. The creation process may perform a loop (blocks 1004–1008) or the like to add links to the link bar.

At block 1004, a content file which is to be associated in the link bar is identified. As described above, identifying the content file may be done, for example, using the drag and drop method or using the link bar window shown in FIG. 6. Once identified, at block 1006, the identified content file is added as a link under the link bar node. If there are additional content files to be added at decision block 1008, the creation process loops back to block 1004 and repeats as described above. Otherwise, the creation process proceeds to block 1010.

At block 1010, the description file is updated to describe the link bar created at block 1002. Updating the description file may include writing a new entry for each link added to the link bar node created at block 1002. The link descriptions include at least a URL or other pointer to the content file referenced by the associated link bar entry, and a reference to the link bar node. The description file is updated at block 1010, and the logic proceeds to block 1011. As those skilled in the art should appreciate, the description file may alternatively be updated within the loop (blocks 1004–1008).

At block 1011, the link bar is associated with a web file, such as a HTML file. As mentioned above, in one embodiment, the web design tool may create a bot in the web file which identifies the associated link bar. If the user adds a new link bar directly in the navigation view (rather than by inserting a link bar into a page), then this step doesn't occur (i.e., the link bar is created, but no bot is inserted into any page). The logic then proceeds to block 1012.

At block 1012, the bot 222 is written to the associated HTML file. An illustrative sample of the bot 222 is shown in FIG. 7 and will be described in detail in conjunction with the translation process shown in FIG. 13. Briefly described, the bot 222 includes comments or instructions that, when interpreted by the web server 218, result in the appropriate HTML code to describe the links 530$_a$–530$_c$ on the web page. The create process then terminates.

Figure 11:
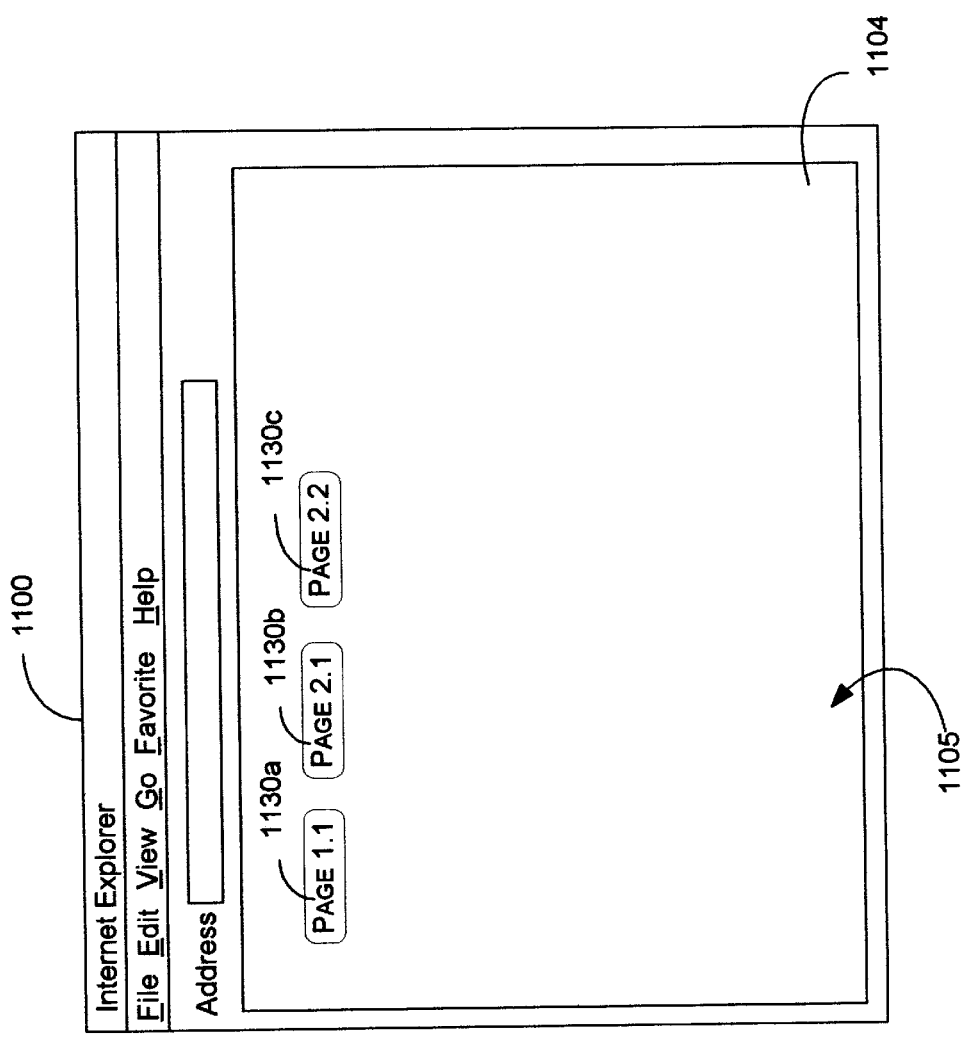
FIG. 11 is a graphical representation of a web page after rendering an illustrative web file which includes the bot shown in FIG. 7.

FIG. 11 is a graphical representation of a rendered web page 1104 that includes the illustrative HTML file having the bot shown in FIG. 7. The web page 1104 is rendered, for example, within a browser window 1100 of the browser 216. As shown, the web page 1104appears similar to the page view 804 shown in the web designing window 800 of FIG. 8, except the web page 1104 does not have the "+ Add Link" hyperlink 532. An additional tag, such as <ADDLINK>, is placed within the HTML file. Because the browser does not recognize the additional tag, the "+ Add Link" hyperlink 532 does not appear in the web page 1104. However, the component for simulating the browser used for the page view 1105 does recognize the additional tag, and thus, displays the "+ Add Link" in the page view. This may done, for example, by formatting the bot tag as a comment which the browser ignores, but some editing applications recognize as a bot. In response to recognizing the bot in the page, the editing software runs special user interface code to render the bot with additional information in the editor (such as the "+add link" link).

The web page 1104 displays link buttons 1130$a$–$c$, which correspond to links 430$a$–$c$ in the link bar tree 820 of FIG. 8, and to link buttons 530$a$–$c$ in the page view 804 of FIG. 8, respectively. One will appreciate that the same link buttons 1130$_a$–1130$_c$ will appear when "Page 1" is rendered in the browser because "Page 1" has the same "SEQUENCE 1" link bar as "Page 2". However, "Page 1" and "Page 2" may have different attributes defined within the bot that may result in the link bar appearing differently (e.g., horizontal in "Page 1" and vertical in "Page 2").

FIGS. 12 and 13 generally illustrate a process for serving the HTML code to the browser, thereby allowing the browser to render the web page 1104 shown in FIG. 11. The process begins preliminarily with a web file being formed (step 1202) and proceeds to block 1202 where the web file is saved to the web server machine 204 (step 1204).

At decision block 1206, the parser 220 (FIG. 2) determines whether a link bar bot 222 (FIG. 2) is in the HTML file. In this implementation, the parser 220 determines that the link bar bot 222 is in the HTML file by noting that a comment appears in the HTML file as "<! Webbot bot= "Navigation" S-type="SEQUENCE 1"" as shown in the illustrative HTML file in FIG. 7. If the link bar bot 222 is not in the HTML file, the web server machine 204 saves the HTML file at step 1208 without modifications. However, if the link bar bot 222 is found in the HTML file, the logic proceeds to block 1210. For servers that do not recognize the additional link bar HTML instructions, the link bars will be treated as comments.

At block 1210, the logic in the parser 220 reads the description file (FIG. 3) and proceeds to block 1212. At block 1212, the parser 220 translates the link bar bot 222 into additional HTML instructions using information stored in the description file. The operation performed at block 1212 is illustrated in detail in FIG. 13 and described below. The additional HTML code is then included in the existing HTML file and is saved to the server at block 1208. The browser may then request the file (step 1214), and the file is served to the browser in step 1216.

FIG. 13 is a logical flow diagram which generally describes a translation process for translating the link bar bot 222 (shown in FIG. 7) into HTML instructions. The process begins at block 1300 and proceeds to block 1302 where the web server 218 locates in the description file the link bar node referenced in the bot 222. The bot 222 identifies the link bar node with the phrase "U-page ="SID:1006"", which informs the web server 218 that the link bar node has the identifier "1006". Thus, the web server 218 searches the description file 212 (FIG. 3) for an entry having the identifier "1006". Once the link bar node is located, the logic proceeds to decision block 1304.

At decision block 1304, the process determines whether there are link entries. Typically, at least one link entry 316 is associated with the link bar node entry 314. To determine that a link entry is associated with the link bar node, the parser searches for entries that list the link bar node identifier (e.g., 1006) in the "parent" column of the description file. For example, as shown in FIG. 3, link entries 316$a$–$c$ list "1006" as the parent, so these entries are treated as link entries. The process proceeds to block 1306.

At decision block 1306, the web server 218 reads the parameters in the bot which provide formatting information for the link bar. For example, "S-Rendering="HTML"" informs the parser that the links within the link bar should be parsed as HTML instructions. Other "S-Rendering" options include "text" and "graphics". "S-Orientation= "Horizontal"" informs the parser that the links in the link bar should appear horizontally across the web page 1104. The S-Orientation may also specify "Vertical" which informs the web server 218 to create HTML instructions resulting in the links in the link bar appearing vertically on the web page.

Other parameters, which may appear if S-Rendering is HTML or graphics, are "S-Btn-Nml", "S-Btn-Sel" and "S-Btn-Sep". The S-Btn-Nml parameter specifies an HTML formatting string for the normal condition of the button (e.g., "S-Btn-Nml="<A HREF="#URL#" TARGET="#TARGET#"STYLE=" {text-decoration: none;}">#LABEL#</A>". The "#LABEL#" parameter is replaced with the button's label when the web page containing the link bar is saved. The button's label is stored in the third column 306 of the description file 212. The "#URL#" parameter may be replaced with the button's link URL when the web page containing the link bar is saved. The S-Btn-Sel parameter specifies an HTML formatting string for the selected condition of the button (e.g., "S-Btn-Sel= "<b>#LABEL#</b>"). The S-Btn-Sel parameter specifies an HTML formatting string for the separator between the buttons (e.g., "S-Btn-Sep= "&nbsp;&bull;&nbsp;"). Additional parameters may appear in the file if it is a graphics file, for example, "S-Theme="Golf"", which informs the web server to apply a golf-type display theme to the link bar. As can be understood, a variety of different formatting parameters may be added in the bot 222. After the parameters are processed, the logic proceeds to block 1308.

At block 1308, the web server 218 creates additional HTML instructions based on the above formatting parameters from the bot 222. After creating the additional HTML instructions, the logic proceeds to block 1310 where the additional HTML instructions 704 (FIG. 7) are inserted into the existing HTML file between the "Start Span>" 702 and the "<! End Span>" 706 instructions (shown in FIG. 7). The logic then loops back to decision block 1304 and proceeds as described above for each additional link entry 316*b*–*c* in the description file 212. Once all the link entries have been translated, the process proceeds to decision block 1312.

At decision block 1312, the logic determines whether another link bar is defined in the bot 222. If so, the logic loops back to block 1302 and proceeds as described above for the new link bar. If all link bars have been translated, the process ends.

Thus, as described above, the web design system of the present invention allows a persistent HTML files to be associated with a link bar, without any constrictions based on the hierarchical structure of the website. The same link bar may then be referenced by multiple HTML pages in order to create a consistent navigational link on multiple web pages. In addition, the present invention allows the web designer to easily modify the set of links within the link bar so that the modified set appears on multiple web pages without requiring each of the multiple web pages to be individually updated. Thus, it is not necessary to individually open each web page to make the desired change. For example, in the implementation described above, only the description file is modified to achieve the modification of the links appearing on the multiple web pages.

If desired, link bars may be nested within other link bars. This permits a website designer to use existing link bars as building blocks for forming other link bars.

While the invention is susceptible to various modifications and alternative constructions, certain illustrated embodiments are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method comprising:

providing a link bar comprising link elements for association with at least two selected web page files of a website, the link elements corresponding to a set of at least two links, each link in the set corresponding to another web page file; and associating the link elements with each of the selected web page files, each link in the set continuing to provide a hyperlink to its corresponding web page file if that web page file is moved with regard to the structural organization of pages of the website by automatically updating hierarchical path information of that page in a data structure that associates the link of the element with the hierarchical path information of the page.

2. The method of claim 1 wherein associating the link elements comprises selecting at least one element from a set of available link elements.

3. The method of claim 2 wherein selecting the at least one link element comprises referencing the link element by a name provided thereto.

4. The method of claim 1 further comprising storing information of the link elements in a description file corresponding to the data structure.

5. The method of claim 4 wherein the description file includes an identifier of each link element and wherein the hierarchical path information comprises a URL designating the web page file to which each link in the set corresponds.

6. The method of claim 1 further comprising, providing one of the selected web page files to a browser for rendering a displayed web page, the browser displaying at least some links on the displayed web page based on the link bar.

7. The method of claim 6 further comprising, storing information of each link element in a description file that corresponds to the data structure, and wherein providing one of the selected web page files comprises, translating the description file based on the element associated with the web page file into additional instructions and sending the additional instructions to the browser, the additional instructions configured to cause the browser to create web links on the corresponding displayed web page.

8. The method of claim 7 wherein the web page file further includes information corresponding to a format for the web links on the corresponding displayed web page.

9. The method of claim 8 wherein the information corresponding to a format is maintained in a web bot.

10. The method of claim 1 further comprising placing another link element into the link bar element.

11. In a computer system, a system comprising:

an environment for designing a website;

a link bar accessible via the environment, the link bar capable of having link elements corresponding to links to web page files of the website added thereto independent of any hierarchy of the web page files of the website by having a data structure that associates each link with current hierarchical path information of a corresponding page to which it links and automatically updating the hierarchical path information of that page if the page is moved in the hierarch; and the environment configured to enable link elements corresponding to links to web page files to be placed on the link bar and to associate the link bar with at least one web page file of the website via the data structure.

12. The system of claim 11 wherein the environment enables selection of the link bar element from a set of available link bars.

13. The system of claim 11 wherein the environment enables the link bar to be named.

14. The system of claim 11 further comprising a description file that maintains the data structure that contains information of the link bar.

15. The system of claim 14 wherein the description file includes an identifier of the link bar element and the current hierarchical path information identifying the web page files to which each link of the link bar element corresponds.

16. The system of claim 11 further comprising, a rendering mechanism for rendering a displayed web page from a web page file having the link bar associated therewith, the rendering mechanism displaying links on the displayed web page based on the link bar.

17. The system of claim 16 wherein the rendering mechanism is incorporated into the environment.

18. The system of claim 17 wherein the rendering mechanism further provides a mechanism for adding link elements corresponding to links to the link bar.

19. The system of claim 16 further comprising a description file containing the data structure that maintains information of the link bar, and an interpretation mechanism that translates the description file into instructions understood by the rendering mechanism to create web links on the corresponding displayed web page.

20. The system of claim 19 wherein the instructions include a format for the web links on the corresponding displayed web page.

21. A computer-readable medium having computer-executable components for associating web files of a website, comprising:

a link bar comprising one or more link elements, each link element corresponding to a link to a content file by an association that includes the exact path of the content file and is automatically updated to continue to associate the link with the content file if the content file is moved within a structural organization of files such that the association between the link and the content file is independent of the structural organization of the files;

a web file including information related to the link bar; and a website file that describes the plurality of content files and describes the link bar.

22. The computer-readable medium of claim 21 wherein the link bar is represented by a node that includes an associated link bar name.

23. The computer-readable medium of claim 22 wherein the information within the web file comprises the link bar name.

24. The computer-readable medium of claim 22 wherein the information within the web file further comprises one or more parameters describing a format for the link when a browser creates a web page corresponding to the web file.

25. The computer-readable medium of claim 21 wherein the content files comprise graphics files.

26. The computer-readable medium of claim 21 wherein the content files comprise HTML files.

27. The computer-readable medium of claim 26 wherein the HTML files are related in a hierarchical website structure having a plurality of parent content files with one or more sibling content files, the link bar element having one link associated with a first sibling content file of a first parent content file and another link associated with a second sibling content file of a second parent content file.

28. The computer-readable medium of claim 21 wherein the content files comprise XML files.

* * * * *